Aug. 5, 1924.

C. K. EDWARDS 1,504,033

GEARING TRANSMITTING DRIVE TO VEHICLE WHEELS

Filed April 9, 1923

INVENTOR:
Charles K. Edwards
By Byrnes, Stebbins & Parmelee
His Atty's

Patented Aug. 5, 1924.

1,504,033

UNITED STATES PATENT OFFICE.

CHARLES KEARNS EDWARDS, OF LONDON, ENGLAND, ASSIGNOR TO THE ASSOCIATED EQUIPMENT COMPANY LIMITED, OF LONDON, ENGLAND, A BRITISH COMPANY.

GEARING TRANSMITTING DRIVE TO VEHICLE WHEELS.

Application filed April 9, 1923. Serial No. 630,733.

*To all whom it may concern:*

Be it known that I, CHARLES KEARNS EDWARDS, a subject of the King of England, residing at Chingford, London, England, have invented certain new and useful Improvements in Gearing Transmitting Drives to Vehicle Wheels, of which the following is a specification.

This invention is for improvements in or relating to gearing transmitting drive to vehicle wheels of the type in which the wheel carries a toothed ring with which meshes a driving gear-wheel eccentric to the axis of the wheel. Such a type of gearing is embodied in vehicles in which the rear axle is sunk below the level of the wheel axes. In these vehicles transverse shafts, housed in the interior of a hollow cranked axle, extend from a differential to the sides of the vehicle where they carry the aforesaid gear-wheels at their outer extremities. In practice this drive is apt to be noisy since it is practically essential to leave the gear-wheels overhanging beyond the shaft bearings, and it is also not an easy matter to manufacture and mount the various parts with the extreme accuracy which is necessary if the drive between the gear-wheels and the toothed rings, as heretofore arranged, is not to be noisy. It is, therefore, an object of the present invention to promote quietness in vehicle gearing of the type above described.

The primary feature of the present invention consists in the provision, in gearing of the type above described, of means for adjusting the relative setting of the gear-wheel and toothed ring in a direction transverse to their axes during the running of the gearing. By providing these means it will be possible to set the gearing running and then choose by trial that adjustment of the parts which is the quietest. The extent of adjustment will usually be very small but as is well-known quite a small adjustment will effect a very large improvement in regard to the noise.

Conveniently, the said gear-wheel shaft is supported in a housing adjacent the gear-wheel by a sleeve whereof the face which makes contact with the housing is eccentric relatively to the gear-wheel and is rotatably mounted in said housing. Thus, by turning the sleeve in its housing the position of the gear-wheel relatively to the toothed ring can be varied. It is preferred to arrange that the said housing takes the form of a recess in a stationary axle, and to provide the sleeve with an operating member extending to the outside of the axle. It is also a feature of the invention to provide means for locking the sleeve in any of a series of positions into which it may be rotated relatively to the housing. Thus, when a suitable setting has been chosen for the parts they will be retained in that position during future running.

For a more complete understanding of the invention there will now be described, by way of example only and with reference to the accompanying drawings, one construction of mechanism according to the invention. It is to be understood, however, that the invention is not limited to the precise constructional details set forth.

In these drawings:—

Like reference numerals indicate like parts throughout the drawings.

Figure 1:
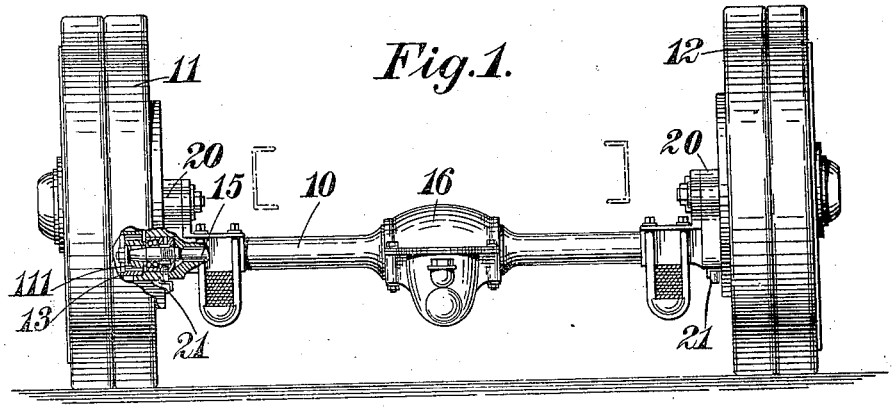
Figure 1 is a rear elevation, partly in section, of a vehicle axle and wheels.
Figure 2:
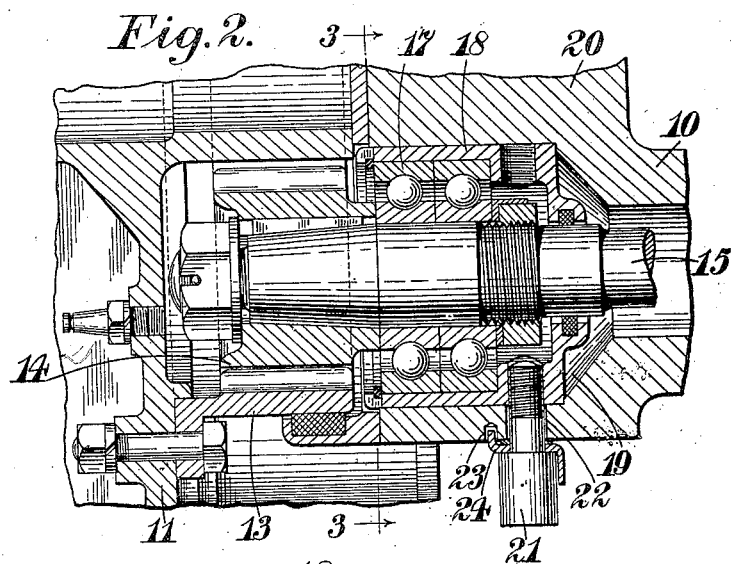
Figure 2 is a detail sectional view of certain of the parts on a scale larger than that of Figure 1.

Referring firstly to Figure 1, it will be seen that the body portion 10 of the crank axle is sunk below the axes of the vehicle wheels 11 and 12. The wheels 11 and 12 themselves carry on their inside faces internally toothed rings 13 with which mesh gear-wheels 14 at the ends of a shaft 15 which extends through the body portion of the axle 10. This shaft 15 is in two parts, connected together towards the middle of the axle by the differential, whereof the casing is shown at 16.

The outer ends of the shaft 15 are each mounted by ball bearings 17 in a sleeve 18 which is housed in an open ended cylindrical recess 19 in the crank web 20 of the axle. The gear-wheels 14 overhang beyond these bearings to mesh with the toothed rings 13 and the noise aforesaid is due to a certain extent to this overhang.

Figure 3:
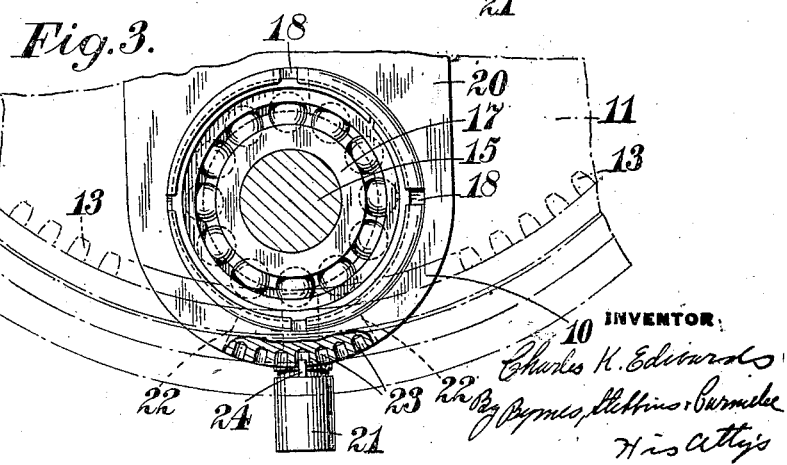
Figure 3 is a section on the line 3—3 of Figure 2.

To reduce the noise to a minimum it is necessary that the gear-wheels 14 should be very carefully adjusted relatively to the toothed rings 13. For this purpose, therefore, the inner cylindrical face of the sleeve 18 is made eccentric relatively to the outer face thereof, as will be apparent from Figure 3 and thus by rotating the sleeve 18 in its housing 19 the end of the shaft carrying the gear-wheel 14 can be moved towards or from the face of the toothed ring 13. Naturally it is preferable to be able to effect this rotation of the sleeve easily from the exterior of the axle. For this purpose, therefore, the sleeve receives a screwed stud 21 which projects through an elongated aperture 22 in the axle. The elongation of this aperture is such as to permit the sleeve 18 to be turned in its housing through an arc. On the outside of the axle adjacent the aperture 22 is a series of recesses 23 into engagement with one or other of which a locking plate 24 carried upon the studs 21 may be brought when the desired adjusted position has been chosen.

For effecting the adjustment, the stud 21 may be slackened back sufficiently to allow the locking plate 24 to slip past the recesses 23. The sleeve 18 can then be turned sufficiently to effect the desired adjustment after which the stud 21 is screwed home again jamming the locking plate 24 into locking position in a recess 23. It will be appreciated that the extent of adjustment required is quite small.

It is to be understood that the invention is not limited to the precise constructional details hereinbefore set forth.

I claim:

In a vehicle, the combination of a hollow fixed axle having at one end a crank arm, a road wheel having a toothed ring so mounted on said arm as to be eccentric with said axle, a driving shaft in said hollow axle, a gear wheel mounted on one end of said driving shaft and meshing with said toothed ring, a sleeve in which said shaft is journaled eccentrically, which sleeve is mounted to rotate in said axle at the cranked end thereof, said axle having a circumferential slot and a plurality of recesses in a line parallel with said slot, a stud carried by said sleeve and extending through said slot, and a detent carried by said stud and arranged to engage said recesses and thereby lock said sleeve against rotation, substantially as described.

In testimony whereof I affix my signature.

CHARLES KEARNS EDWARDS.